US007831524B2

(12) United States Patent
Whitehouse

(10) Patent No.: US 7,831,524 B2
(45) Date of Patent: Nov. 9, 2010

(54) TRACKING RECORDATION SYSTEM FOR PACKAGES

(75) Inventor: Harry T. Whitehouse, Portolo Valley, CA (US)

(73) Assignee: PSI Systems, Inc., Palo Alto, CA (US)

(*) Notice: Subject to any disclaimer, the term of this patent is extended or adjusted under 35 U.S.C. 154(b) by 773 days.

(21) Appl. No.: 11/165,636

(22) Filed: Jun. 23, 2005

(65) Prior Publication Data
US 2006/0020505 A1 Jan. 26, 2006

Related U.S. Application Data

(60) Provisional application No. 60/584,872, filed on Jun. 30, 2004.

(51) Int. Cl.
*G06Q 30/00* (2006.01)
(52) U.S. Cl. .................................................. 705/333
(58) Field of Classification Search ............. 705/1, 705/333
See application file for complete search history.

(56) References Cited

U.S. PATENT DOCUMENTS

| 5,787,400 | A  | * | 7/1998  | Weber ............................ 705/1 |
| 6,701,215 | B1 | * | 3/2004  | Stadermann ................. 700/225 |
| 6,865,560 | B1 | * | 3/2005  | Sansone et al. ............. 705/404 |
| 7,028,895 | B2 | * | 4/2006  | Ashaari ........................ 235/385 |
| 2002/0032612 | A1 | * | 3/2002 | Williams et al. ............... 705/26 |
| 2003/0101148 | A1 | * | 5/2003 | Montgomery et al. ....... 705/404 |
| 2003/0171948 | A1 | * | 9/2003 | Thomas et al. ................. 705/1 |
| 2004/0098355 | A1 | * | 5/2004 | Biasi et al. ................... 705/404 |
| 2004/0188522 | A1 | * | 9/2004 | Ashaari ........................ 235/385 |
| 2004/0215480 | A1 | * | 10/2004 | Kadaba ........................... 705/1 |
| 2005/0144059 | A1 | * | 6/2005 | Schuessler ...................... 705/9 |
| 2005/0171791 | A1 | * | 8/2005 | Chimenti et al. ............... 705/1 |
| 2005/0228681 | A1 | * | 10/2005 | McMahon ...................... 705/1 |
| 2005/0228761 | A1 | * | 10/2005 | Monsen et al. .............. 705/401 |

OTHER PUBLICATIONS

Muraskin, Ellen, "It's a Telephone; No, It's a Shipping App", Computer Telephony, p. 22, Aug. 1998.*
"Neopost Logistics Systems to Demonstrate iLS.X, a New Modular Site of Web-Enabled Logistics Applications, at the ProMat 2001 Show", Business Wire, p. 0760, Feb. 12, 2001.*

* cited by examiner

*Primary Examiner*—John W Hayes
*Assistant Examiner*—Kevin Flynn
(74) *Attorney, Agent, or Firm*—Pillsbury Winthrop Shaw Pittman LLP

(57) ABSTRACT

The systems and methods described herein relate generally to the electronic recordation of the transfer of a package from a shipper to a responsible postal carrier. In one embodiment, a method of recording the acceptance of a package from a package shipper shipped via a post service includes the steps of: generating a unique header number to preface a record of package transactions made over a time period for a specific shipper, the header number being unique within the post service, wherein each package transaction is made with a centralized computer system and has an associated delivery confirmation number unique within the post service; transmitting the unique header number and transaction record to the post service; generating a scannable indicia representative of the unique header number; and scanning the indicia to confirm acceptance of the package by the post service, wherein the indicia is scanned by a post service representative.

42 Claims, 4 Drawing Sheets

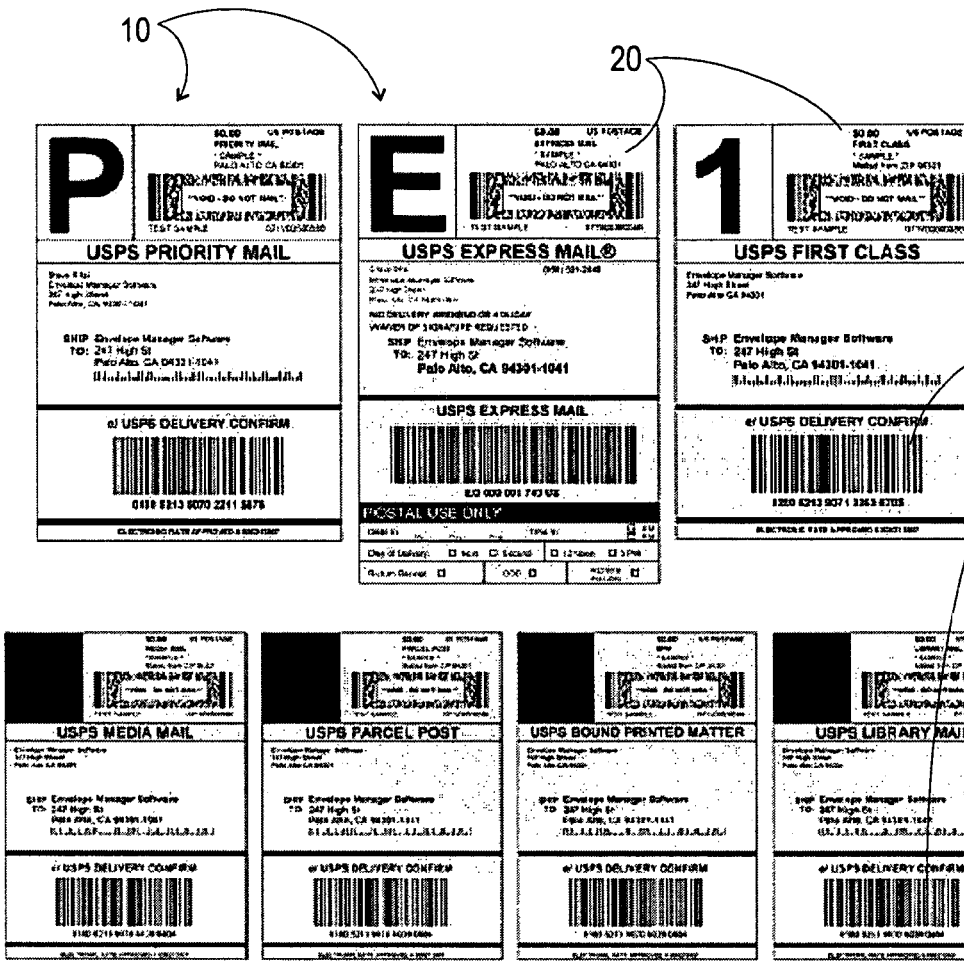
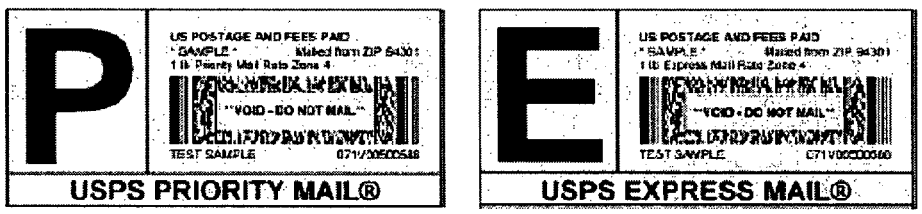
FIG. 1
*(PRIOR ART)*
FIG. 2
*(PRIOR ART)*

40

United States Postal Service
Confirmation Services Certification 06/08/2004

Company Information

| Company Name: | Address(Number, street, suite no., city, state, and ZIP Code) |
|---|---|
| Envelope Manager | |
| | 247 HIGH ST |
| D-U-N-S® Number | PALO ALTO, CA 94301-1041 |

Electronic File

The electronic file submitted by the company shown above has been certified by the National Customer SUpport Center (NCSC) to be complete and accurate in both content and transmission and to meet the requirements as defined in Publication 91, *Confirmation Services Technical Guide*.

| Authorized NCSC Signature | Date Signed |
|---|---|
| | |

Barcoded Labels

The barcoded labels printed and submitted by the company shown above have been certified by the National Customer Support Center to be complete and accurate in both content and transmission and to meet the requirements as defined in Publication 91, *Confirmation Services Technical Guide*, and the appropriate ANSI or AIM published standards.

| Authorized NCSC Signature | Date Signed |
|---|---|
| | |

Instructions for Mailer

Keep the original of this form in a safe place. Make a photocopy for each mailing and place a barcode representing the Delivery Confirmation Electronic File Number from the electronic file for this SPECIFIC MAILING below. If you cannot print the barcode, fill in the serial number and check digit (the last nine characters) from your Confirmation Services Electronic File Number. This information is in the header record of your electronic file, positions 17-25, (for UCC/EAN 128) or positions 15-23 (for all other barcode symbologies).

Place the barcode here, OR write the Serial Number and Check Digit of the electronic file in the spaces provided:

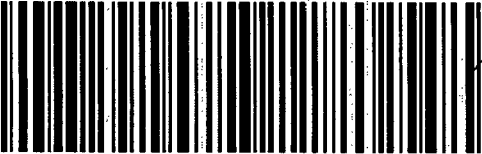

USPS DELIVERY CONFIRMATION

9150148008600000035620

— 45

Number of Pieces: 12

Postage of $165.74 *paid in full* using Endicia Internet Postage metering. Meter ID 071V00500361

Instructions for Acceptance Employee

If mailings are presented under an authorized manifest mailing system, verify payment of postage and fees, where applicable, using standard sampling procedures for pieces with special services. In addition, check the barcode formatting for the following:

(1) Horizontal bars above and below the barcode;
(2) Human readable numbers below the barcode; and;
(3) Depending on the Confirmation Service used, the words "USPS DELIVERY CONFIRMATION", "USPS DELIVERY CONFIRM", "USPS SIGNATURE CONFIRMATION", "USPS SIGNATURE CONFIRM", OR "INSURED".

| Date and Time of Verification | Date and Time of Mailing (If different from date of verification) |
|---|---|
| | |

PS Form 3152, September 2003

FIG. 3
*(PRIOR ART)*

TRACKING RECORDATION SYSTEM FOR PACKAGES

CROSS-REFERENCE TO RELATED APPLICATIONS

This application claims the benefit of U.S. Provisional Application Ser. No. 60/584,872, filed Jun. 30, 2004, entitled "Tracking Recordation System for Packages," the disclosure of which is incorporated herein by reference in its entirety.

FIELD OF THE INVENTION

The systems and methods described herein relate generally to the electronic recordation of the transfer of a package from a shipper to a responsible postal carrier.

BACKGROUND INFORMATION

The United States Postal Service (USPS) lost much of its package business in the period since 1970 to competitors like United Parcel Service (UPS), Federal Express and DHL. Currently, the US Postal Service holds less than a 10% market share of all domestic package shipments. There are a number of reasons for this staggering shift in the marketplace but one major factor was that USPS competitors offered package tracking. Federal Express was a pioneer in this arena—the first to provide a package label with integral barcode that is applied by the shipper. When the package is transferred to Federal Express care, an "acceptance scan" of the barcode is performed. Data from this scan event flows to a centralized computer system and records the date and time of acceptance, the location where the package was accepted, and the package ID as evidenced by the barcode representation.

During the delivery cycle, the package is scanned at various distribution points and the associated data is sent to a centralized computer system. At delivery, a final delivery scan is undertaken and sometimes a recipient signature and/or name are captured. This data is similarly transferred to a centralized computer system.

The net result is that the package path may be traced from the point the shipper gives over possession to the carrier, through the entire shipping cycle, and to the final destination. This information was initially made available via call centers and later migrated to Web-based information systems. Now it is a standard practice for shippers and their customers to check on the status of their packages during the delivery cycle.

In the early 1990's—nearly a decade after Federal Express started—the USPS finally introduced a tracked package service called Express Mail. But by that time Federal Express, UPS and others had captured the bulk of the overnight and expedited package delivery market. Additionally, the USPS tracking system was not as sophisticated as its competitors and its delivery performance also lagged behind the industry.

In the mid to late 1990's, package carriers began to offer tracking on lower priority packages which traveled by surface transportation. While slower, "ground services" were attractively priced and still offered a complete tracking from the shipper to the recipient. FedEx, UPS and others further penetrated this market by offering easier methods to create shipping labels—moving from multi-part forms which required manual entry to computer- and Web-generated shipping labels. Multi-part carbon-form labels were supplanted by single ply computer generated labels which could be quickly and easily produced by the shipper.

In fairness, one should note that the extensive focus on package ID's and acceptance scans by USPS's competitors was largely derived by the need to bill the shipper for transportation services. The acceptance scan captured critical information needed for invoicing and payment processes. The US Postal Service, in contrast, is largely a "pay in advance" business model where many shippers apply postage of some form (stamps, postage meter strips, PC postage) before inducting the mail. Because of this, it has not nearly as critical for the USPS to identify and track each and every package it accepts.

But from a customer perspective today, tracking is a de facto requirement. Medium and high volume shippers want some publicly-available indication that they both fulfilled a customer's order and handed that order over to a shipping agent. The package recipients want an independent confirmation of the same event.

Currently the USPS offers a "Track/Confirm Services." The wording has been carefully, chosen because only one domestic USPS service offers true tracking—Express Mail. Express Mail is scanned at acceptance when the piece is transferred from the shipper to the USPS, is scanned at intermediate processing points, and is finally scanned at the destination. But Express Mail is expensive and only justified if one needs an overnight or 2 day delivery cycle.

The vast major of packages handled by the USPS instead use a service called "Delivery Confirmation" which was first offered in the late 1990's. There are two versions of Delivery Confirmation—a retail counter version costing on the order of 55 cents (over and above the postage), and an "electronic" version, which is either free or 13 cents (depending upon the class of mail). The key feature of Delivery Confirmation is that the US Postal Service guarantees that the only delivery event will be recorded. That is, the date, time, and delivery ZIP5 of the delivery event will be provided by contacting a USPS call center or visiting the USPS Web site.

Examples of labels 10 with Express Mail tracking and electronic delivery confirmation are shown in FIG. 1. These examples 10 include a relatively new postage evidencing system called IBI 20 (Information Based Indicia) or PC postage, which not only may evidence a valid postage, but also information about the sender, and the particular postage transaction.

It should be noted that a similar service is available called signature confirmation. Once again, only the delivery event is memorialized, but in addition to the date, time and ZIP5 of the delivery, the USPS will also capture a signature of the recipient. The cost of the "electronic" version of this service is $1.25 over and above the normal postage charge.

The two versions of delivery confirmation—retail and electronic—deserve clarification. The retail version is designed for a customer who presents one or several packages at a USPS Post Office facility. The customer will pay for the required postage and optionally be offered a delivery confirmation service for roughly 55 cents more. If the customer opts for this feature, the USPS retail clerk will remove a preprinted delivery confirmation barcode sticker 30, having a barcode 35, such as that depicted in FIG. 2, from a book of such stickers and affix it to the package.

The retail clerk will then scan the delivery confirmation barcode 35 and enter the destination ZIP5 of the package into his/her computer terminal. These two pieces of information (delivery confirmation number and destination ZIP5) flow up to a USPS centralized package tracking system (not shown) along with the date and time of acceptance and the location of the origin Post Office. This is truly an "acceptance scan", but the USPS still does not represent the process as "tracking"

because they cannot guarantee any intermediate scans of the package as it traverses from origin to destination.

The other version of delivery confirmation—"electronic"—is favored by computer-savvy shippers and volume shippers. A major advantage is that the USPS pricing for this electronic service is either free (for Priority Mail) or 13 cents (for First Class, Parcel Post, and Media Mail) rather than 55 cents. Second, the delivery confirmation barcode, e.g., 35, can be issued via low-cost "electronic" means rather than via a costly face-to-face retail transaction. Thirdly, the shipper can avoid waiting in line at the Post Office and instead induct his/her packages in a variety of other less time-consuming ways. The labels 10 in FIG. 1 are examples of computer generated "electronic" delivery confirmation and tracking technologies, such as a confirmation barcode 25.

Delivery confirmation numbers are typically 16 digits in length, although the barcode 25 itself generally represents 22 characters. The USPS has settled on a protocol whereby the first digits of the delivery confirmation number are comprised of the Dun and Bradstreet ("Duns") number of some business entity. The precise specifications are presented below:

(1) Application Identifier (AI): two characters; identifies the article as a Delivery Confirmation piece, (2) Service Type Code (STC): two characters; identifies the type of product or service used for each item, (3) Customer ID: nine characters; DUNS® number that uniquely identifies the customer, (4) Package Sequence Number (PSN): eight characters; fixed sequential number, and (5) Modulus 10 Check digit: one character.

High volume package shipper can create or purchase a "manifesting" system (generally priced between $2000 and $60,000) which generates unique delivery confirmation numbers at the shipper's site based on the shipper's Duns number followed by a unique ascending number. At the end of the shipping day, the manifesting system transmits all of the delivery confirmation numbers issued (along with the associated delivery address, package weight and mail class data) to the USPS product tracking system ("PTS") computer using an file transfer protocol ("FTP")-type process. The manifesting system utilizes a permit indicium on the shipping label 10 which is linked to the shipper's prepaid USPS account.

The shipper must bring his packages to a Business Mail Entry section of a Main Post Office for acceptance and presentation of the billing paperwork. The "manifest" is a detailed listing of each package, its destination, weight and mail class. The appropriate postage-due for each package is included in the manifest and totaled for the entire shipment. The USPS Bulk Mail Acceptance clerk reviews this documentation, spot checks the physical packages, and then deducts the grand total of postage due from the shipper's USPS account.

One element of paperwork produced by the manifesting system is an acceptance scan form 40, an example of which is shown in FIG. 3. The form 40 includes a barcode 45 that represents a unique number assigned to all of the tracking data uploaded by the shipper that day via the FTP process. The USPS clerk at the Business Mail Entry section will scan this barcode 45. When the associated scan data reaches the USPS PTS computer, it is merged with the data previously transferred by FTP and marks each of the individual packages as "accepted" with a specific date/time and location.

The high volume shipper thus has two key points of information available for public view. First, there is the record of transferring the package to the USPS (at the Business Mail Entry site). Second is the delivery event as recorded by the USPS mail carrier at the destination. One significant problem with manifesting is that it is available only to shippers with adequate financial resources, requires presentation of the packages at the USPS Business Mail Entry site (typically the back dock of the Main Post Office), has a daily minimum of 50 lbs, and requires that the shipper make his operations available for unannounced inspections by the US Postal Service.

The retail counter delivery confirmation process is too expensive and time consuming for even a small business shipper. And yet few shippers are large enough to justify buying a $2000-$60,000 manifesting system to support delivery confirmation—particularly when no such investment is required for UPS or FedEx shipping. UPS and FedEx shipping tools are provided free or charge and are very easy to use.

In order to partially address this problem, the USPS created a Web application program interface ("API") called Webtools. The Webtools system is simply an intermediate computer server which has two basic functions:

1. Issue unique delivery confirmation numbers in real-time in response to authenticated XML internet requests from a variety of shippers.

2. Upload a daily file to the USPS PTS system describing all delivery confirmation issued that day along with the associated package information.

In essence, Webtools acts like a free, centralized manifesting system. The XML query must contain the complete delivery address for the package, the weight of the package, the class of mail and other elements identifying the shipper. If all data elements meet the relevant error checks, the Webtools system issues an XML response with a unique delivery confirmation number. The numbers issued in this way all have a leading set of numbers which are based on a USPS-affiliated Dun and Bradstreet number.

This service was enthusiastically received by many software developers as a means to create shipping labels 10 like those shown in FIG. 1 without having to burden the end-user shipper with expensive systems and complex FTP end-day processes.

While this process has been adopted for use by many shipping tools (e.g., Endicia Internet Postage, the USPS Click-and-Ship Web site, and the EBay/Paypal Shipping Label system) it has one major drawback—the lack of an acceptance scan. USPS based it's costing for electronic delivery confirmation (free or 13 cents) on the premise that a) there would be one scan per day for major manifesting shippers representing the hundreds or thousands of packages inducted or b) no acceptance scan for non-manifesting customers.

The USPS stance of prohibiting acceptance scans of labels bearing electronic delivery confirmation is published as national policy. While USPS carrier scan guns can indeed perform this type of scan from a technical perspective, from a cost and labor perspective they are prohibited from doing so. The USPS has somewhat limited flexibility in such issues because all USPS cost structures go through a public review process involving the Postal Rates Commission. The USPS presents so-called "rate-cases" to the Postal Rate Commission and this case presents proposed new rates and the detailed cost justifications for the rates. Once a rate case is accepted and approved by the Postal Rates Commission and the USPS, the rate structure is locked until the next rate case is approved. The cycle for a typical rate case is 2 years and it involves comments and critiques from the public, the mailing industry, and very significantly, USPS competitors like UPS and FedEx.

In the last rate case, the USPS argued for free (or 13 cent) electronic delivery confirmation and a 55 cent retail delivery confirmation charge, on the premise that the retail interaction required measurable labor to sell the feature, collect finds, apply the sticker, scan the barcode and enter the destination ZIP5 into the retail computer manually. For electronic delivery confirmation, no face-to-face transaction was envisioned and all data regarding the package and its destination flowed via computer networks from the shipper's site to the USPS PTS. The USPS rate makers incorrectly assumed that an acceptance scan was not desired.

The result is that there are legions of USPS package shippers using delivery confirmation which have no public record confirming that the package was indeed transferred to the USPS. While the event of data receipt is duly recorded, the phrasing on the USPS Track/Confirm Web site is vague: "The US Postal Services has been electronically notified by the shipper or the shipper's agent on Jun. 4, 2004 to expect your package for mailing."

This essentially means that a shipping label has been printed—it does not indicate if the shipper actually transferred the package to the USPS or if it is still sitting in his shipping room. This situation can be unnerving in some commercial situations. For example, an EBay auction typically unites a buyer and seller who have never interacted before and will never see one another personally. The seller has an incentive to ship quickly after the close of the auction so that his "feedback rating" does not suffer due to a disgruntled buyer. The electronic delivery confirmation generated by the EBay system simply tells the world when the seller printed the label from the EBay site. But without an acceptance scan, no one knows when the seller actually placed the package in the mail stream.

Accordingly, improved systems and methods for recording the acceptance of a package by a postal carrier are needed.

SUMMARY OF INVENTION

The systems and methods described herein relate generally to the electronic recordation of the transfer of a package from a shipper to a responsible postal carrier. An online postage system is configured to enable a user to perform one or more shipping transactions via a post service. The online postage system includes an end user computer, a centralized computer system, and a communications link connecting the end user computer with the centralized postage-issuing computer system. The end user computer is configured enable a user to perform one or more shipping transactions, and the centralized computer system is configured for generating a unique header number to preface a record of package transactions made over a time period for the end user, the header number being unique within the post service, wherein each package transaction is made with the centralized computer system and has an associated delivery confirmation number unique within the post service, transmitting the unique header number and transaction record to the post service, and generating a scannable indicia representative of the unique header number, wherein the indicia is configured to confirm acceptance of the package by the post service if scanned by a post service representative.

In another embodiment, a method of recording the acceptance of a package from a package shipper shipped via a post service includes the steps of: generating a unique header number to preface a record of package transactions made over a time period for a specific shipper, the header number being unique within the post service, wherein each package transaction is made with a centralized computer system and has an associated delivery confirmation number unique within the post service; transmitting the unique header number and transaction record to the post service; generating a scannable indicia representative of the unique header number; and scanning the indicia to confirm acceptance of the package by the post service, wherein the indicia is scanned by a post service representative.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The details of the invention, including fabrication, structure and operation, may be gleaned in part by study of the accompanying figures, in which like reference numerals refer to like segments.

FIG. 1 depicts examples of labels with Express Mail tracking and electronic delivery confirmation.

FIG. 2 depicts an example of a preprinted delivery confirmation barcode sticker.

FIG. 3 depicts an example of an acceptance scan form generated by the manifesting system.

DETAILED DESCRIPTION

The systems and methods described herein provide for an improved method for electronically recording the transfer of a package from a shipper to the responsible carrier or post service. The systems and methods described herein are an extension to the USPS Webtools centralized manifesting concept and provides a low cost solution to the acceptance scan issue. These systems and methods require no change to any of the USPS computer systems relating to track/confirm.

In a preferred embodiment, the systems and methods described herein can be used with the systems and methods described in U.S. Pat. No. 5,319,562, issued Aug. 23, 1994, U.S. Pat. No. 5,341,505, issued Aug. 23, 1994, U.S. Pat. No. 6,005,945, issued Dec. 21, 1999, U.S. patent application 2003/0101143, published on May 29, 2003, U.S. patent application 2003/0101147 published on May 29, 2003 and U.S. patent application 2003/0101148, also published on May 29, 2003. Each of these patents and applications are herein incorporated by reference in their entirety. These patents and applications, in part, point out the value of using tracking (or delivery confirmation) numbers on domestic USPS shipments to reduce fraud, provide a refund methodology which accounts for misprints and other events outside of the user's control. These applications also set forth a centralized online postage system capable of use with the systems and methods described herein.

Figure 4:
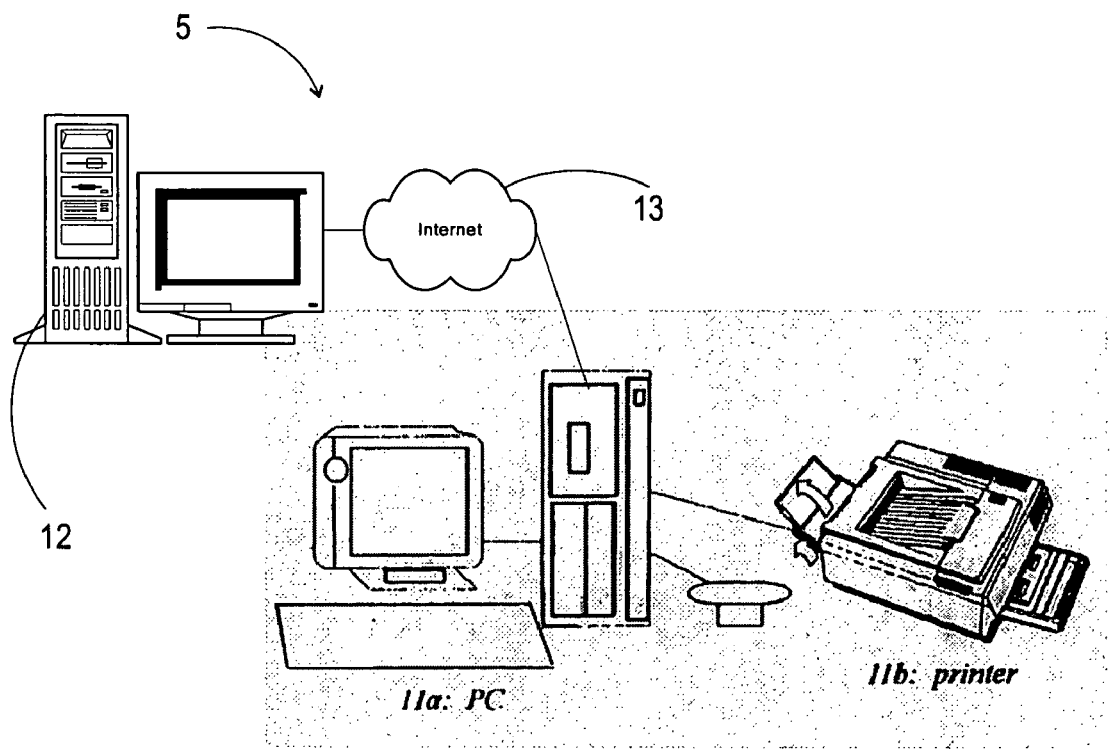
FIG. 4 is a system diagram of an online postage system known in the art.

For example, turning to FIG. 4, the computer environment 5 in which a user may purchase online postage is shown. A user at a personal computer 11a connects to a server computer 12 configured to enable the user to electronically purchase valid postage, typically via an Internet-type network 13. The user interacts with a software program, e.g., DAZzle by Envelope Manager Software, on the personal computer 11a, downloaded from the server computer 12, installed on the personal computer 11a, and/or embedded in a web page accessible via a Web browser, that allows the user to manage postage purchases.

Any system issuing delivery confirmation numbers (e.g. a manifesting program, the USPS Webtools Server, a PC Postage Server) generates unique delivery confirmation numbers using a Duns number as a root. For each confirmation number issued, there are associated data collected which include the complete delivery address, package weight, mail class, date, and shipper information. Periodically (typically at end-day), this information is transmitted to the USPS PTS computer in a file having a specified format. A simplified representation of this file format appears below:

| Record 1 | Header Record | 505503303033 | | | | |
|---|---|---|---|---|---|---|
| Record 2 | Transaction 1 Media Mail | 10000000000000001 | Mr. Jones | 123 Main St | Mt. Holly NJ 08060 | 5 lbs |
| Record 3 | Transaction 2 Parcel Post | 10000000000000002 | Mr. Smith | 44 Wilson Rd | Palo Alto CA 94301 | 3 lbs |
| Record n + 1 | Transaction n Priority Mail | 10000000000000003 | Mr. Love | 70 Oak St | Portola Valley 94028 | 2 lbs |

The Header Record, above, preferably contains a unique number generated by a manifest operator following procedures specified by the USPS. The Header Record number is a single representative index for the following "n" delivery confirmation (or tracking) transactions.

The acceptance scan process for a manifesting system was described previously. The single barcode 45, e.g., see FIG. 3, that is scanned by a USPS Business Mail Entry clerk is a representation of the Header Record number. Thus, when an indication of that acceptance scan reaches the USPS Record number, if found, all of the associated transactions are then given a status of "accepted" and the date, time and location of acceptance are also associated with each of the packages.

These systems and methods capitalize on the fact that the USPS PTS system can accept any number of file transmissions, each with its unique Header Record number. In fact, the PTS system can accept a file with multiple Header Record numbers spread throughout that file. Each Header Record number represents the delivery confirmation transactions which follow, up to the point that a new Header Record number is encountered.

These systems and methods consists of a centralized computer system, e.g., 12, which accepts requests for delivery confirmations numbers from a wide spectrum of shippers, each identified by a unique customer number. In the case of a centralized PC postage system, e.g., 12, each shipper would have a unique account number with a PC postage vendor. As delivery confirmation numbers are issued, a transaction record is built comprised of the elements required by the USPS PTS system, e.g., associated delivery address, package weight and mail class data. Importantly, each transaction record is associated with a specific shipper.

As each shipper ends his or her day, they can contact the centralized manifesting system via a Web browser or other internet-capable software client and indicate that their shipping operations are complete for the day. This interaction triggers several events:

1. A unique Header Record number is generated at the centralized computer server cluster, e.g., 12, to preface all of the package transactions collected during that day for that shipper.

2. The Header Record number and transactions associated with that shipper are transmitted from the centralized manifesting system to the USPS PTS.

3. The shipper prints a hard copy form with a barcode representation of the Header Number, e.g., 45, to be used as an acceptance scan for the entire package group.

These systems and methods allow small, intermediate and even large package shippers to obtain delivery (and signature) confirmation numbers from a low-cost centralized service such as a PC postage vendor. Consider a small shipper who creates twenty packages a day. Using a PC postage service (typically with a service charge of only $15/month), the shipper can create shipping labels 10 with delivery confirmation and full postage as shown in FIG. 1. At day's end, or the end of any other arbitrary time period, the shipper can go to the PC postage vendor's Web site and close out the shipping day, printing a simple one page acceptance scan form, e.g., 40.

Unlike manifesting, the shipper need not take his packages to the Main Post Office as they have been prepaid with digital postage. Rather he can give the packages to his carrier when he delivers to his site, or call for a pickup from the USPS under the new "Free Carrier Pickup Program" announced in late 2003. The carrier simply scans a single barcode, e.g., 45 shown in FIG. 3, representing all 20 packages and loads them on his truck. The carrier's gun responds to the scan with a simple "Accept: Yes/No" and the carrier presses a "Yes" button. This scan does not violate the spirit of the USPS Headquarters directive of no scans for electronic delivery confirmation because the single form leverages what would be 20 individual scans (with subsequent data entry of the destination ZIP code for each package) with a single scan and a single Yes/No response.

Finally, these systems and methods provide both the shipper and the recipient with the publicly-accessible database displaying the exact date and time when the USPS assumed responsibility for the package.

Figure 5:
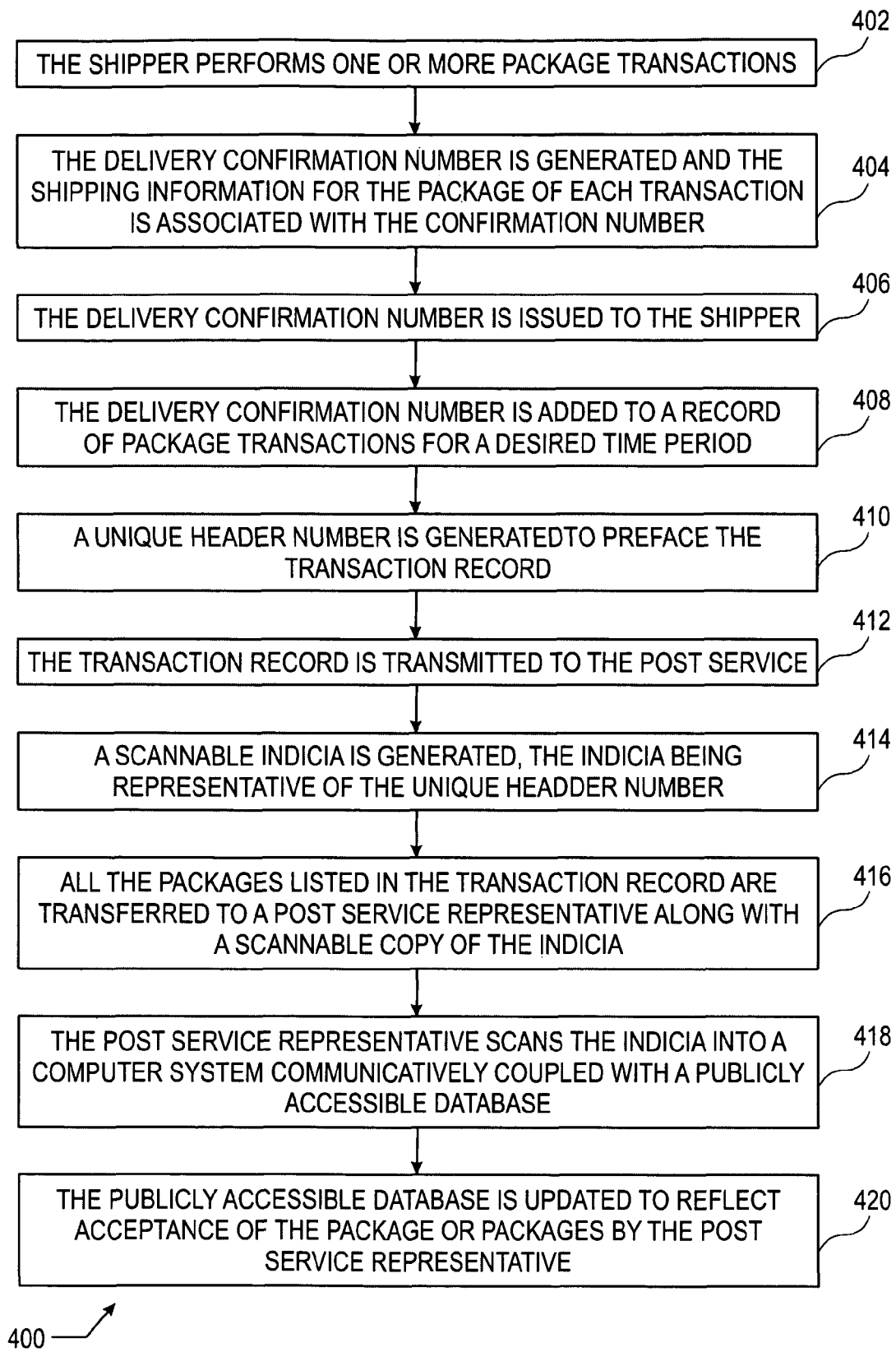
FIG. 5 depicts an exemplary method of recording the acceptance of a package by the post service.

FIG. 5 is a flow chart depicting one exemplary embodiment of a method 400 for electronically recording the acceptance of a package from a shipper in accordance with the systems and methods described herein. In this exemplary embodiment, a shipper uses a PC Postage system 12 such as those described in the patent and patent applications incorporated by reference above, to generate a shipping label 10 and pay the appropriate postage amount by interfacing with the centralized PC Postage system, e.g., 12. At step 402, the shipper performs one or more package transactions. Each package transaction includes the requesting of a unique delivery confirmation number from the PC Postage system 12, where the delivery confirmation number is unique within the post service, e.g., the USPS and other national or regional postal services or private carrier services.

At step 404, the delivery confirmation number is generated and the shipping information for the package of each transaction is associated with the confirmation number. At step 406, the delivery confirmation number is issued to the shipper. At step 408, the delivery confirmation number is added to a record of package transactions for a desired time period. At step 410, a unique Header Record number is generated according to guidelines put in place by the respective post service and used to preface the transaction record. If desired, a unique Header Record number can be generated for each package transaction within the record, in which case the record would contain multiple header record numbers.

At step 412, the transaction record is transmitted to the post service. At step 414 a scannable indicia is generated, such as a barcode 25 and the like, the indicia being representative of the unique Header Record number. At step 416, all the packages listed in the transaction record are transferred to a post service representative along with a scannable copy of the indicia. At step 418, the post service representative scans the indicia into a computer system communicatively coupled with a publicly accessible database. Finally, at step 420, the publicly accessible database is updated to reflect acceptance of the package or packages by the post service representative. The database is preferably searchable by the delivery confirmation number contained within each transaction record. By accessing this database, any member of the public who knows the delivery confirmation number can confirm that the package or packages have been shipped.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for recording an acceptance scan for a package shipped via the United States Postal Service (USPS), comprising:
    generating a unique header number to preface a record that includes one or more package transactions made over a time period for a specific non-manifesting shipper having a customer account with an online postage vendor, the unique header number being unique within the USPS and generated at a manifesting computer system provided by the online postage vendor, wherein the manifesting computer system generates the unique header number according to one or more guidelines specified by the USPS;
    generating one or more respective unique tracking identifiers for the one or more package transactions in the record, each of the respective unique tracking identifiers being unique within the USPS and generated at the manifesting computer system;
    building the record at the manifesting computer system, wherein the unique header number prefaces the record and the respective unique tracking identifiers for the one or more package transactions follow the unique header number in the record, and wherein the record built at the manifesting computer system comprises a plurality of elements required by a product tracking system provided at the USPS;
    electronically transmitting the unique header number that prefaces the record and the record that includes the one or more package transactions from the manifesting computer system to the product tracking system provided at the USPS;
    generating a scannable indicia representative of the unique header number that prefaces the record, wherein the non-manifesting shipper accesses the manifesting computer system to print the scannable indicia representative of the unique header number that prefaces the record on a hard copy acceptance scan form; and
    confirming that the USPS has accepted one or more packages carrying the respective unique tracking identifiers for the one or more package transactions in the record in response to determining that a representative of the USPS has scanned the scannable indicia printed on the hard copy acceptance scan form.

2. The method of claim 1, wherein each of the unique tracking identifiers for the one or more package transactions include a delivery confirmation number comprising a Dun and Bradstreet number generated according to a protocol specified by the USPS.

3. The method of claim 1, wherein the plurality of elements required by the product tracking system provided at the USPS comprise a respective delivery address, a respective package weight, and a respective mail class associated with the respective unique tracking identifiers for each of the one or more package transactions in the record.

4. The method of claim 3, further comprising updating a publicly accessible database coupled to the manifesting computer system to indicate that the USPS has accepted the one or more packages carrying the respective unique tracking identifiers for the one or more package transactions in the record in response to determining that the representative of the USPS has scanned the scannable indicia printed on the hard copy acceptance scan form.

5. A non-transitory computer readable storage medium, embodying a sequence of instructions for recording an acceptance scan for one or more shipping transactions shipped via the United States Postal Service (USPS), wherein executing the sequence of instructions embodied in the computer readable storage medium on a processor causes the processor to:
    receive one or more package transaction requests at a manifesting computer system provided by an online postage vendor, wherein the one or more package transaction requests are received from a non-manifesting shipper having a customer account with the online postage vendor;
    generate a unique header number to preface a record that includes one or more package transactions made over a time period for the non-manifesting shipper, wherein the one or more package transactions in the record respectively correspond to the one or more package transaction requests received from the non-manifesting shipper, the unique header number being unique within the USPS and generated at the manifesting computer system provided by the online postage vendor, and wherein the manifesting computer system generates the unique header number according to one or more guidelines specified by the USPS;
    generate one or more respective unique tracking identifiers for the one or more package transactions in the record, each of the respective unique tracking identifiers being unique within the USPS and generated at the manifesting computer system;
    build the record at the manifesting computer system, wherein the unique header number prefaces the record and the respective unique tracking identifiers for the one or more package transactions follow the unique header number in the record, and wherein the record built at the manifesting computer system comprises a plurality of elements required by a product tracking system provided at the USPS;

electronically transmit the unique header number that prefaces the record and the record that includes the one or more package transactions from the manifesting computer system to the product tracking system provided at the USPS;

generate a scannable indicia representative of the unique header number that prefaces the record, wherein the non-manifesting shipper accesses the manifesting computer system to print the scannable indicia representative of the unique header number that prefaces the record on a hard copy acceptance scan form; and confirm that the USPS has accepted one or more packages carrying the respective unique tracking identifiers for the one or more package transactions in the record in response to determining that a representative of the USPS has scanned the scannable indicia printed on the hard copy acceptance scan form.

6. The non-transitory computer readable storage medium of claim 5, wherein each of the unique tracking identifiers for the one or more package transactions include a delivery confirmation number comprising a Dun and Bradstreet number generated according to a protocol specified by the USPS.

7. The non-transitory computer readable storage medium of claim 5, wherein the plurality of elements required by the product tracking system provided at the USPS comprise a respective delivery address, a respective package weight, and a respective mail class associated with the respective unique tracking identifiers for each of the one or more package transactions in the record.

8. The non-transitory computer readable storage medium of claim 7, wherein executing the sequence of instructions on the processor further causes the processor to update a publicly accessible database coupled to the manifesting computer system to indicate that the USPS has accepted the one or more packages carrying the respective unique tracking identifiers for the one or more package transactions in the record in response to determining that the representative of the USPS has scanned the scannable indicia printed on the hard copy acceptance scan form.

9. The non-transitory computer readable storage medium of claim 5, wherein the time period comprises at least ten hours.

10. An online postage system configured to record an acceptance scan for one or more shipping transactions shipped via the United States Postal Service (USPS), comprising:

a manifesting computer system provided by an online postage vendor; and a communications link connecting the manifesting computer system with a computer system associated with a non-manifesting shipper having a customer account with the online postage vendor, and further connecting the manifesting computer system with a product tracking system provided at the USPS, wherein the manifesting computer system is configured to:

receive one or more package transaction requests from the computer system associated with the non-manifesting shipper over the communications link;

generate a unique header number to preface a record that includes one or more package transactions made over a time period for the non-manifesting shipper, wherein the one or more package transactions in the record respectively correspond to the one or more package transaction requests received from the computer system associated with the non-manifesting shipper, the unique header number being unique within the USPS and generated at the manifesting computer system provided by the online postage vendor, and wherein the manifesting computer system generates the unique header number according to one or more guidelines specified by the USPS;

generate one or more respective unique tracking identifiers for the one or more package transactions in the record, each of the respective unique tracking identifiers being unique within the USPS and generated at the manifesting computer system;

build the record at the manifesting computer system, wherein the unique header number prefaces the record and the respective unique tracking identifiers for the one or more package transactions follow the unique header number in the record, and wherein the record built at the manifesting computer system comprises a plurality of elements required by the product tracking system provided at the USPS;

electronically transmit the unique header number that prefaces the record and the record that includes the one or more package transactions from the manifesting computer system to the product tracking system provided at the USPS;

generate a scannable indicia representative of the unique header number that prefaces the record, wherein the non-manifesting shipper accesses the manifesting computer system to print the scannable indicia representative of the unique header number that prefaces the record on a hard copy acceptance scan form; and confirm that the USPS has accepted one or more packages carrying the respective unique tracking identifiers for the one or more package transactions in the record in response to determining that a representative of the USPS has scanned the scannable indicia printed on the hard copy acceptance scan form.

11. The system of claim 10, wherein the scannable indicia printed on the hard copy acceptance form includes a two-dimensional barcode.

12. The system of claim 10, wherein each of the unique tracking identifiers for the one or more package transactions include a delivery confirmation number comprising a Dun and Bradstreet number generated according to a protocol specified by the USPS.

13. The system of claim 10, wherein the plurality of elements required by the product tracking system provided at the USPS comprise a respective delivery address, a respective package weight, and a respective mail class associated with the respective unique tracking identifiers for each of the one or more package transactions in the record.

14. The system of claim 13, further comprising a publicly accessible database coupled to the manifesting computer system, wherein the manifesting computer system is further configured to update the publicly accessible database to indicate that the USPS has accepted the one or more packages carrying the respective unique tracking identifiers for the one or more package transactions in the record in response to determining that the representative of the USPS has scanned the scannable indicia printed on the hard copy acceptance scan form.

15. A method for recording an acceptance scan for one or more shipping transactions shipped via the United States Postal Service (USPS), wherein each shipping transaction has a package associated therewith, the method comprising:

providing a non-manifesting shipper access to a manifesting server provided by an online postage vendor, wherein the manifesting server is configured to receive one or more package transaction requests from the non-manifesting shipper, and wherein the non-manifesting shipper has a customer account with the online postage vendor;

generating one or more respective unique tracking identifiers for one or more package transactions that respectively correspond to the one or more package transaction requests received from the non-manifesting shipper, each of the respective unique tracking identifiers being unique within the USPS and generated at the manifesting server;

issuing the one or more respective unique tracking identifiers for the one or more package transactions to the non-manifesting shipper;

adding the one or more unique tracking identifiers issued to the non-manifesting shipper to a record that includes the one or more package transactions, wherein the one or more package transactions are made over a time period for the non-manifesting shipper;

generating a unique header number to preface the record that includes the one or more package transactions made over the time period for the non-manifesting shipper, the unique header number being unique within the USPS and generated at the manifesting server provided by the online postage vendor, and wherein the manifesting server generates the unique header number according to one or more guidelines specified by the USPS;

build the record at the manifesting server, wherein the unique header number prefaces the record and the respective unique tracking identifiers for the one or more package transactions follow the unique header number in the record, and wherein the record built at the manifesting server comprises a plurality of elements required by a product tracking system provided at the USPS;

electronically transmitting the unique header number that prefaces the record and the record that includes the one or more package transactions from the manifesting server to the product tracking system provided at the USPS;

generating a scannable indicia representative of the unique header number that prefaces the record, wherein the non-manifesting shipper accesses the manifesting server to print the scannable indicia representative of the unique header number that prefaces the record on a hard copy acceptance scan form; and confirming that the USPS has accepted one or more packages carrying the respective unique tracking identifiers for the one or more package transactions in the record in response to determining that a representative of the USPS has scanned the scannable indicia printed on the hard copy acceptance scan form.

16. The method of claim 15, further comprising generating one or more respective unique self-validating postage indicia for the one or more package transactions in the record, wherein the one or more respective unique self-validating postage indicia provide postage required by the USPS for delivering the one or, more packages.

17. The method of claim 16, wherein generating the one or more respective unique self-validating postage indicia includes:

generating one or more respective unique character strings for the one or more unique postage indicia, the one or more unique character strings being unique within the USPS and generated at the manifesting server;

deriving one or more respective digital signatures from the one or more unique character strings; and associating the one or more respective digital signatures with the one or more unique postage indicia to generate the one or more respective unique self-validating postage indicia.

18. The method of claim 17, wherein the one or more unique character strings comprise the one or more respective unique tracking identifiers.

19. The method of claim 17, wherein associating the one or more respective digital signatures with the one or more unique postage indicia includes attaching the respective digital signatures to the respective unique postage indicia.

20. The method of claim 17, wherein the non-manifesting shipper applies the one or more respective unique self-validating postage indicia to the one or more packages carrying the respective unique tracking identifiers for the one or more package transactions in the record.

21. The method of claim 20, wherein the non-manifesting shipper applies the one or more respective unique self-validating postage indicia to the one or more packages in a barcode format.

22. The method of claim 21, wherein the one or more packages include at least one mail piece.

23. The method of claim 21, wherein the one or more packages include at least one envelope.

24. The method of claim 21, wherein the non-manifesting shipper further applies the one or more respective unique character strings to the one or more packages independently of the unique self-validating postage indicia.

25. The method of claim 17, wherein deriving the one or more respective digital signatures includes applying respective private keys to the one or more unique character strings.

26. The method of claim 17, wherein the one or more unique character strings originate from within the USPS.

27. The method of claim 17, wherein the one or more respective unique self-validating postage indicia respectively include at least one of an indicia version number, an algorithm identification, a certificate serial number, a device identification, an ascending register, a postage, a date of mailing, an originating zip code, a software identification, a descending register, or a rate category.

28. The method of claim 15, further comprising updating a publicly accessible database coupled to the manifesting server to indicate that the USPS has accepted the one or more packages carrying the respective unique tracking identifiers for the one or more package transactions in the record in response to determining that the representative of the USPS has scanned the scannable indicia printed on the hard copy acceptance scan form.

29. The method of claim 1, wherein each of the unique tracking identifiers for the one or more package transactions include one or more of a delivery confirmation number, a signature confirmation number, an express mail number, a priority mail number, or a customs form number generated according to a protocol specified by the USPS.

30. The method of claim 1, wherein the scannable indicia printed on the hard copy acceptance scan form includes a two-dimensional barcode.

31. The method of claim 1, wherein the manifesting computer system generates the one or more respective unique tracking identifiers in response to receiving one request from the non-manifesting shipper.

32. The computer readable storage medium of claim 5, wherein each of the unique tracking identifiers for the one or more package transactions include one or more of a delivery confirmation number, a signature confirmation number, an express mail number, a priority mail number, or a customs form number generated according to a protocol specified by the USPS.

33. The computer readable storage medium of claim 5, wherein the scannable indicia printed on the hard copy acceptance form includes a two-dimensional barcode.

34. The computer readable storage medium of claim 5, wherein the manifesting computer system generates the one or more respective unique tracking identifiers in response to receiving one request that includes the one or more package transaction requests from the non-manifesting shipper.

35. The computer readable storage medium of claim 5, wherein executing the sequence of instructions on the processor further causes the processor to associate each of the one or more package transactions in the record with the customer account that the non-manifesting shipper has with the online postage vendor.

36. A method for recording an acceptance scan for shipments to be shipped via the United States Postal Service (USPS), comprising:

receiving one or more package transaction requests from a non-manifesting shipper at a manifesting computer system provided by an online postage vendor, each of the package transaction requests comprising a request to ship one or more packages via the USPS, wherein the non-manifesting shipper having a customer account with the online postage vendor;

generating one or more respective unique tracking identifiers for one or more package transactions that respectively correspond to the one or more package transaction requests received from the non-manifesting shipper, each of the respective unique tracking identifiers being unique within the USPS and generated at the manifesting computer system;

generating a unique header number to preface a record that includes the one or more package transactions for the non-manifesting shipper in response to an "end of shipping day" message received from the non-manifesting shipper, the unique header number being unique within the USPS and generated at the manifesting computer system provided by the online postage vendor, and wherein the manifesting computer system generates the unique header number according to one or more guidelines specified by the USPS;

generating a scannable barcode representative of the unique header number that prefaces the record at the manifesting computer system, wherein the non-manifesting shipper accesses the manifesting computer system to print the scannable barcode representative of the unique header number that prefaces the record on a hard copy acceptance scan form; and confirming that the USPS has accepted one or more packages carrying the respective unique tracking identifiers for the one or more package transactions in the record for the non-manifesting shipper in response to determining that a representative of the USPS has scanned the scannable barcode printed on the hard copy acceptance scan form.

37. The method of claim 4, wherein the publicly accessible database is updated to indicate a date and a time when the USPS accepted the one or more packages carrying the respective unique tracking identifiers for the one or more package transactions.

38. The method of claim 3, wherein the one or more package transactions in the record include the unique tracking identifier, the delivery address, the package weight, and the mail class associated with each of the respective package transactions.

39. The method of claim 1, wherein the non-manifesting shipper provides the one or more packages to the representative of the USPS when the representative of the USPS delivers to a site associated with the non-manifesting shipper, and wherein the representative of the USPS scans the scannable indicia printed on the hard copy acceptance scan form when the representative of the USPS picks up the one or more packages from the site associated with the non-manifesting shipper.

40. The method of claim 1, wherein the non-manifesting shipper requests a pickup for the one or more packages under a Free Carrier Pickup Program provided by the USPS, and wherein the representative of the USPS scans the scannable indicia printed on the hard copy acceptance scan form when the representative of the USPS picks up the one or more packages from the non-manifesting shipper under the Free Carrier Pickup Program.

41. A method for recording an acceptance scan for a package shipped via the United States Postal Service (USPS), comprising:

generating a first unique header number to preface a first record that includes a first plurality of package transactions made over a time period for a first non-manifesting shipper having a first customer account with an online postage vendor, the first unique header number being unique within the USPS, generated at the manifesting computer system provided by the online postage vendor, and associated with a first plurality of unique tracking identifiers generated for the first plurality of package transactions in the first record;

generating a second unique header number to preface a second record that includes a second plurality of package transactions made over the time period for a second non-manifesting shipper having a second customer account with the online postage vendor, the second unique header number being unique within the USPS, generated at the manifesting computer system provided by the online postage vendor, and associated with a second plurality of unique tracking identifiers generated for the second plurality of package transactions in the second record, wherein the manifesting computer system generates the first unique header number and the second unique header number according to one or more guidelines specified by the USPS;

electronically transmitting the first unique header number that prefaces the first record, the first record that includes the first plurality of package transactions, the second unique header number that prefaces the second record, and the second record that includes the second plurality of package transactions within one file from the manifesting computer system to the product tracking system provided at the USPS;

confirming that the USPS has accepted a first plurality of packages carrying the first plurality of unique tracking identifiers generated for the first plurality of package transactions in the first record in response to determining that the USPS has scanned a first scannable indicia printed on a first hard copy acceptance scan form, wherein the first scannable indicia represents the first unique header number that prefaces the first record; and confirming that the USPS has accepted a second plurality of packages carrying the second plurality of unique tracking identifiers generated for the second plurality of package transactions in the second record in response to determining that the USPS has scanned a second scannable indicia printed on a second hard copy acceptance scan form, wherein the second scannable indicia represents the second unique header number that prefaces the second record.

42. The method of claim 1, wherein each of the unique tracking identifiers for the one or more package transactions include a delivery confirmation number comprising an identifier that uniquely identifies the non-manifesting shipper, and wherein the identifier that uniquely identifies the non-manifesting shipper is generated according to a protocol specified by the USPS.

* * * * *